US012367072B2

(12) United States Patent
Ganti et al.

(10) Patent No.: US 12,367,072 B2
(45) Date of Patent: Jul. 22, 2025

(54) VIRTUAL MACHINE-INITIATED WORKLOAD MANAGEMENT

(71) Applicant: International Business Machines Corporation, Armonk, NY (US)

(72) Inventors: Veena Ganti, Austin, TX (US); Lakshmi Yadlapati, Austin, TX (US); Rui Yang, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 636 days.

(21) Appl. No.: 16/747,122

(22) Filed: Jan. 20, 2020

(65) Prior Publication Data

US 2021/0224121 A1 Jul. 22, 2021

(51) Int. Cl.
*G06F 9/50* (2006.01)
*G06F 9/455* (2018.01)

(52) U.S. Cl.
CPC ........ *G06F 9/5011* (2013.01); *G06F 9/45558* (2013.01); *G06F 9/5083* (2013.01); *G06F 2009/45591* (2013.01)

(58) Field of Classification Search
CPC .. G06F 9/5011; G06F 9/45558; G06F 9/5083; G06F 2009/45591; G06F 2209/508; G06F 9/5027; G06F 2209/5011
See application file for complete search history.

(56) References Cited

U.S. PATENT DOCUMENTS

| | | | |
|---|---|---|---|
| 8,966,318 B1* | 2/2015 | Shah | G06F 11/3664 714/28 |
| 9,244,711 B1* | 1/2016 | Kondaveeti | G06F 11/3442 |
| 9,658,778 B2* | 5/2017 | Faulkner | G06F 3/0617 |
| 9,800,549 B2 | 10/2017 | Leung et al. | |
| 10,104,166 B2 | 10/2018 | Chauhan | |
| 10,133,619 B1* | 11/2018 | Nagpal | G06F 11/079 |
| 10,237,187 B2 | 3/2019 | Paramasivam | |
| 2004/0044999 A1* | 3/2004 | Gibson | G06F 8/65 717/173 |

(Continued)

OTHER PUBLICATIONS

Cordero et al. "IBM PowerVM Virtualization Introduction and Configuration" IBM Redbooks, Jun. 2013, pp. 1-790. (Year: 2013).*

(Continued)

*Primary Examiner* — Aimee Li
*Assistant Examiner* — Willy W Huaracha
(74) *Attorney, Agent, or Firm* — Garg Law Firm, PLLC; Rakesh Garg; Stosch Sabo

(57) ABSTRACT

A method of administering a shared pool of computer system resources that includes monitoring, by a first node, resources made of a first cluster having the first and second node, and where the resources use a network to communicate with each other, maintaining, by the first cluster, a record made of parameters associated with performance of the first and second node, and monitoring, by the first node, a database made of the record. The method also includes determining, by the first node, whether the parameters associated with performance of the first and second node exceeds a threshold value, responsive to the parameters exceeding the threshold value, notifying, by the first node, a control node, and notifying, by the first node, a user to check the resources when the parameters exceeds the threshold value.

18 Claims, 6 Drawing Sheets

(56) References Cited

U.S. PATENT DOCUMENTS

| | | | | |
|---|---|---|---|---|
| 2009/0044265 A1* | 2/2009 | Ghosh | ................... | G06F 21/552 709/224 |
| 2013/0054807 A1* | 2/2013 | Sherwood | ............... | G06F 12/16 709/226 |
| 2013/0297802 A1* | 11/2013 | Laribi | .................... | H04L 47/80 709/226 |
| 2015/0355923 A1* | 12/2015 | Keller | ................ | G06F 9/45558 718/1 |
| 2016/0127509 A1* | 5/2016 | Uriel | .................. | G06F 9/45558 709/203 |
| 2016/0205518 A1* | 7/2016 | Patel | ....................... | H04W 4/08 455/518 |
| 2018/0307518 A1* | 10/2018 | Imada | .................... | G06F 3/0683 |
| 2020/0136825 A1* | 4/2020 | Gupta | .................... | G06F 9/445 |

OTHER PUBLICATIONS

Castillo et al. "IBM PowerVM Getting Started Guide" Red Paper, Feb. 2012, pp. 1-104 (Year: 2012).*

IP.com, System and methods to efficiently manage workload patterns in the Cloud, Jan. 31, 2013, :https://ip.com/IPCOM/000225221.

IP.com, Optimized Workload Management Using Cluster Wide View, Feb. 23, 2019, https://ip.com/IPCOM/000257612.

ETSI, Network Functions Virtualisation (NFV); Resiliency Requirements, 2015, ETSI GS NFV-REL 001 V1.1.1.

IP.com, A Method and System for Re-Instantiating a Cluster in a Geographically Dispersed Resiliency (GDR Environment, Apr. 9, 2018, :https://ip.com/IPCOM/000253534.

Oracle, Oracle Solaris Cluster What's New, Oracle Solaris, 2017.

* cited by examiner

VIRTUAL MACHINE-INITIATED WORKLOAD MANAGEMENT

TECHNICAL FIELD

The present invention relates generally to a method, computer program product, and system in the field of computer system management. More particularly, the present invention relates to a method, computer program product, and system for managing the workload of high availability virtual machines in a computer system.

BACKGROUND

Management of computer systems resources, including but not limited to memory devices, processing systems, virtual machines (VMs), virtual input/output servers (VIOSes), and power systems includes utilizing a set of high availability (HA) and disaster recovery (DR) solutions. In computing, a VM is an emulation of a computer system. VMs are based on computer architectures that provide the functionality of a physical computer. VIOSes are virtual I/O server nodes that service the VMs. Typically, there are at least 2 VIOSes present in a computer system. A managed system is a system that includes at least 2 VIOSes, each associated with several VMs. Managed systems are used to provide redundancy in a computing environment in response to unscheduled outages, overloads, excessive workloads, or equipment failures.

The physical, "real-world" hardware running the VM is generally referred to as the 'host' and the VM emulated on the host is generally referred to as the 'guest'. A host can emulate several guests, each of which can emulate different operating systems and hardware platforms. VM implementations often involve specialized hardware, software, or a combination of both hardware and software. Therefore, each host is associated with at least one VIOS managing one or more VM's. Different hosts can run on different hardware independently and can operate using different operating systems.

There are different kinds of virtual machines, each with different functions. System VMs (also termed full virtualization VMs) provide a substitute for a real machine. A system VM provides functionality needed to execute entire operating systems. A hypervisor (a VM monitor that creates and runs VMs on the host machine) uses native execution to share and manage hardware, thus allowing for multiple environments which are isolated from one another, yet exist on the same physical machine. Process VMs are designed to execute computer programs in a platform-independent environment. Some VMs are designed to also emulate different architectures and allow execution of software applications and operating systems written for another processor or architecture.

VIOS is a technique used in computing environments to lower costs, improve performance, and enables efficient server management. The virtual I/O methodology allows a single physical adapter card to be seen as multiple virtual network interface cards (NIC's) and virtual host bus adapters (HBA's), which operate just like conventional NIC's and HBA's. In virtualized environments, server I/O plays a major role in deploying the server effectively and successfully. Virtualized servers are capable of running multiple applications at a time. Virtual I/O methodology helps in removing performance bottlenecks by binding I/O to a single connection. This single virtual I/O connection usually has a bandwidth that exceeds the server's I/O capacity. In virtualized servers running I/O-intensive applications, the virtual I/O technique can help increase virtual machine performance as well as the number of virtual machines per server.

HA is the ability of a system or system component to be continuously operational for a desirably long length of time, and can be measured relative to "100% operational" or "never failing". A HA server cluster (HA cluster) is a group of servers that supports server applications which can be utilized with a minimal amount of downtime when any server node fails or experiences overload. A HA cluster is often required for several reasons including load balancing, failover servers, and backup systems. HA clusters operate by using HA software to harness redundant computers in groups or clusters that provide continued service when system components fail. Without clustering, if a server running a particular application crashes, the application will be unavailable until the crashed server is fixed. HA clustering remedies this situation by detecting hardware/software faults and immediately restarting the application on another system without requiring administrative intervention. As part of this process, clustering software configures the node before starting the application on it. For example, appropriate file systems may need to be imported and mounted, network hardware may have to be configured, and some supporting applications may need to be running as well.

DR involves a set of policies, tools, and procedures to enable the recovery or continuation of vital technology infrastructure and systems following a natural or human-induced disaster. DR focuses on the information technology (IT) or technology systems supporting critical business functions, as opposed to business continuity, which involves keeping all essential aspects of a business functioning despite significant disruptive events. DR can therefore be considered as a subset of business continuity. Continuous data protection (CDP), also called continuous backup or real-time backup, refers to backup of computer data by automatically saving a copy of every change made to that data, essentially capturing every version of the data that the user saves.

Shared Storage Pool (SSP) clusters are a grouping or aggregate of all the VIOSes that are part of various managed systems. SSP clusters are a server-based storage virtualization method that provides distributed storage access to a client partitions via VIOSes. SSP's are based on a cluster of VIOSes and a distributed data object repository with a global namespace. Each VIOS that is part of a cluster represents a cluster node. SSP's provide benefits in improve the usage of available storage, simplify administration tasks, simplify the aggregation of large numbers of disks among the VIOSes, and provides better usage of the available storage by using thin provisioning. The thinly provisioned device is not fully backed by physical storage if the data block is not in actual use.

In some instances, a SSP cluster is leveraged for Geographically Dispersed Resiliency (GDR) to form a novel DR solution that enables computer systems users to achieve low recovery times for both planned and unplanned outages. GDR consists of automation software, installation services, and remotely based support for the software after installation. This solution provides systems and data replication monitoring along with server and network management, which helps simplify the tasks associated with recovery while maintaining HA. GDR provides automated DR operations and increases availability without requiring expert skills. Built-in functionality can decrease the need for expert-level skills while helping to shorten recovery time, improve attaining recovery point objectives, optimize backups, and provide highly automated DR operations through on-demand and routine discovery and validation of the computing environment.

SUMMARY

The illustrative embodiments provide a method, computer program product, and system. An embodiment includes a method of administering a shared pool of computer system resources that includes monitoring, by a first node, resources made of a first cluster having the first and second node, and where the resources use a network to communicate with each other, maintaining, by the first cluster, a record made of parameters associated with performance of the first and second node, and monitoring, by the first node, a database made of the record. The method also includes determining, by the first node, whether the parameters associated with performance of the first and second node exceeds a threshold value, responsive to the parameters exceeding the threshold value, notifying, by the first node, a control node, and notifying, by the first node, a user to check the resources when the parameters exceeds the threshold value.

An embodiment includes a computer usable program product. The computer usable program product includes one or more computer-readable storage devices and program instructions stored on at least one of the one or more storage devices, the stored program instructions includes program instructions to monitor, by a first node running an application, computer system resources made of a first cluster having the first node and a second node, where the computer system resources use a network to communicate with each other, program instructions to maintain, by the first cluster, a first record made of parameters associated with performance of the first node and the second node, and program instructions to monitor, by the first node, a database comprised of the first record. The stored program instructions also include program instructions to determine, by the first node, whether the parameters associated with performance of the first node and the second node exceeds a first threshold value, responsive to the parameters exceeding the first threshold value, program instructions to notify, by the first node, a control node, and program instructions to notify, by the first node, a user to check the computer system resources when the parameters exceeds the first threshold value.

An embodiment includes a computer system. The computer system includes a computer system with one or more processors, one or more computer-readable memories, one or more computer-readable storage devices, and program instructions stored on at least one of the one or more storage devices for execution by at least one of the one or more processors via at least one of the one or more memories, the stored program instructions include program instructions to monitor, by a first node running an application, computer system resources that includes a first cluster having the first node and a second node, where the computer system resources use a network to communicate with each other. The system also includes program instructions to maintain, by the first cluster, a first record made of parameters associated with performance of the first node and the second node, program instructions to monitor, by the first node, a database comprised of the first record, and program instructions to determine, by the first node, whether the parameters associated with performance of the first node and the second node exceeds a first threshold value. The system also includes, responsive to the parameters exceeding the first threshold value, program instructions to notify, by the first node, a control node, and program instructions to notify, by the first node, a user to check the computer system resources when the parameters exceeds the first threshold value.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
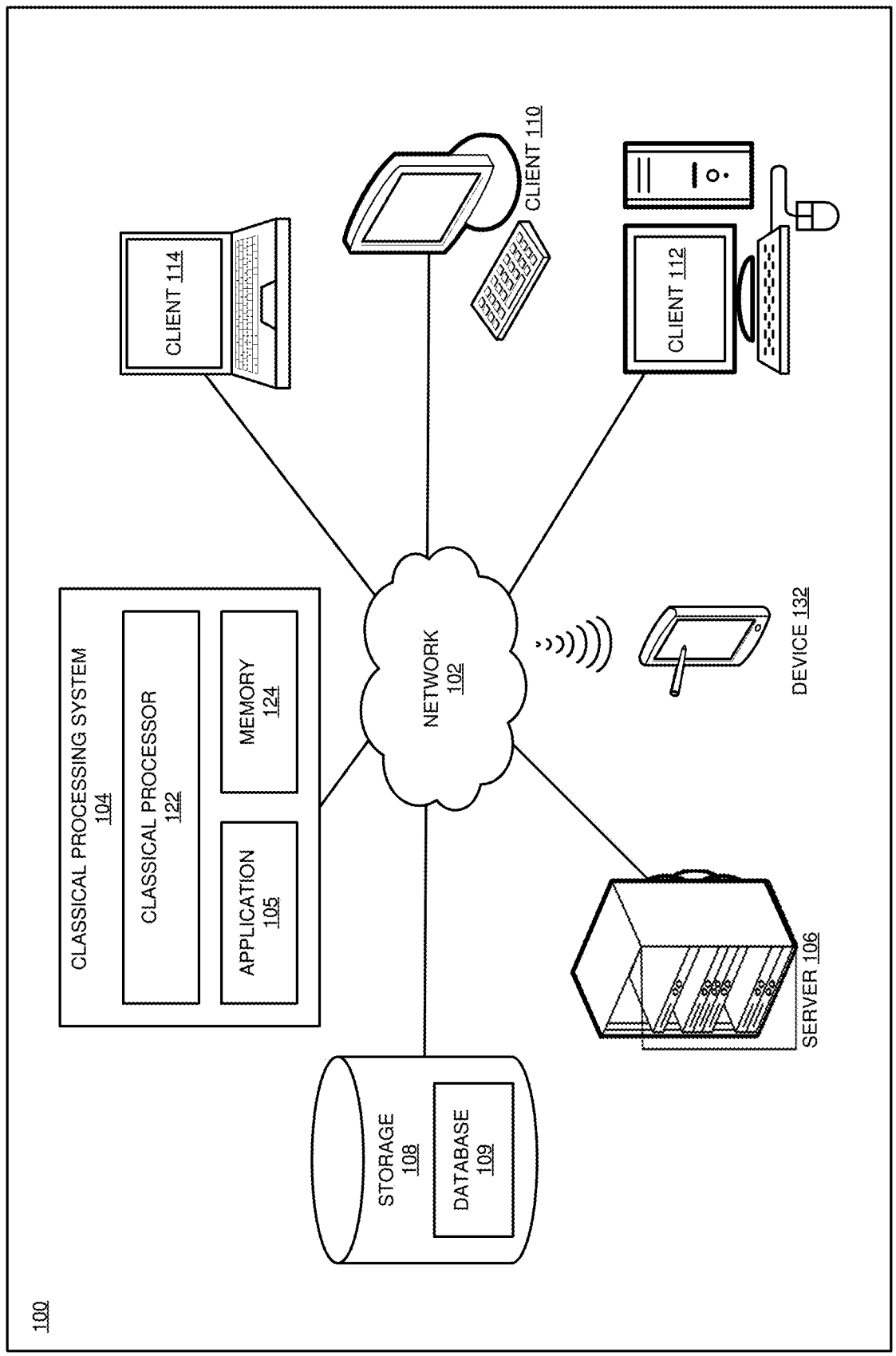
FIG. 1 depicts a block diagram of a network of data processing systems in which illustrative embodiments may be implemented.

The illustrative embodiments recognize that there is a need to administer control over computer systems in several configurations, including those containing server farms, VMs, VIOSes, power systems, and SSP's. Often, computer systems are managed from a control node. In some embodiments, the control node is a dedicated server that communicates with elements of the computer system, while in other embodiments the control node is a common server assigned monitoring tasks in addition to executing applications. Other embodiments are possible and are not limited by this example.

In one example, a computer system data center contains one or more host groups, with each group having one or more managed systems. Each managed system has two or more VIOSes nodes and several VM nodes which are serviced by their parent VIOSes. For high reliability and business continuity, HA applications cannot be offline, or 'down' for any length of time. For data centers containing hundreds of VMs, the control node has the responsibility to communicate with and monitor each VM to determine the VM's health and status. The control node's workload becomes correspondingly more burdensome as the number of VMs and VIOSes rise. As data centers grow larger, this places an increasingly heavy burden on the control node, reducing the control node's response times, lowers the HA effectiveness, and limits effective response options to DR events.

According to some embodiments, it is more efficient to instruct each VIOS to communicate with each VM within the VIOS's environment to determine the health and status of each VM and the associated applications running on each VM. Then, the control node queries each of the several VIOSes to ascertain the health and status of each VM associated with that VIOS. Thus, the control node needs to communicate with and manage only the VIOSes associated with the computer system while permitting the VIOSes to communicate and manage the VMs under each VIOS.

In some embodiments, a VM runs multiple applications, including an application for monitoring its own performance metrics and the performance metrics of other VM's within the cluster. The application then sends the performance metric information to the control node for further administrative action.

According to some embodiments, a GDR HA solution uses SSP clustering which has a distributed database that is accessible from all VIOS nodes in the cluster. VIOSes update the health of all VMs and applications in the SSP database. A dedicated control system node or "kontrol system" (KSYS) queries the SSP database from one of the VIOS nodes and receives the health and status of all VMs efficiently. According to some embodiments, the KSYS is the control node that communicates with the VIOSes via the network to manage a group of managed systems made of VIOSes and VMs for DR and HA purposes. The cluster-wide health and status information can then be used by KSYS to make informed policy decisions efficiently.

The illustrative embodiments recognize that the presently-available tools or solutions do not address these needs or provide adequate solutions for these needs. The illustrative embodiments used to describe the invention generally address and solve the above-described problems and other problems related to a need to administer control over computer systems in several configurations, including those containing server farms, VMs, VIOSes, power systems, managed systems, and SSP's.

An embodiment can be implemented as a software application. The application implementing an embodiment can be configured as a modification of an existing communications and monitoring system, as a separate application that operates in conjunction with an existing communications and monitoring system, a standalone application, or some combination thereof.

Particularly, some illustrative embodiments provide a method where a VM communicates with other VM's and with the VIOSes, where the VIOSes contain health and status information on each VM associated with that VIOS. Using that information, the VM alerts the control node and also a user on the health and status of each VM, and whether as issue has arisen.

The manner of VM's communicating with VIOSes containing VM health and status information is unavailable in the presently-available methods in the technological field of endeavor pertaining to computer system management. A method of an embodiment described herein, when implemented to execute on a device or data processing system, comprises substantial advancement of the functionality of that device or data processing system in administering a shared pool of computer system resources.

The illustrative embodiments are described with respect to server farms, VMs, VIOSes, power systems, managed systems, and SSP's only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data computer system device may provide the data to an embodiment of the invention, either locally at a data processing system or over a data network, within the scope of the invention. Where an embodiment is described using a mobile device, any type of data computer system device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers. According to some embodiments, server 106 is a VIOS managing a number of VMs. Application 105 implements an embodiment described herein. In one embodiment, application 105 queries server 106 (A VIOS) to collect the health and status information on each VM associated with that VIOS.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
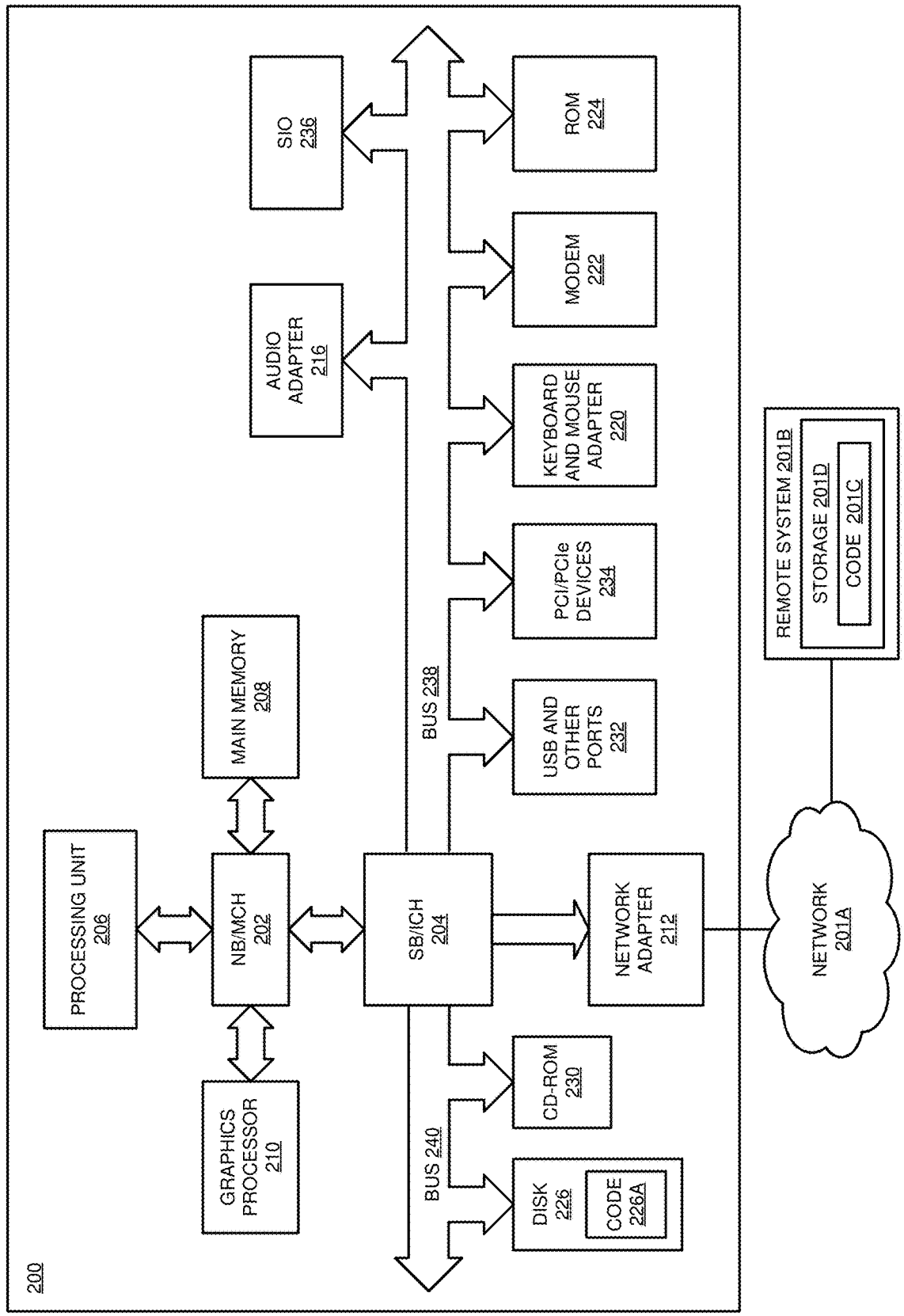
FIG. 2 depicts a block diagram of a data processing system in which illustrative embodiments may be implemented.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as classical processing system 104 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations. In some embodiments, data processing system 200 is a VIOS as disclosed in FIG. 1 utilizing the network adapter 212. In other embodiments, a number of VMs are associated with the data processing system 200 to form a SSP of computer resources.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An artifact oriented or other type of programming system may operate in conjunction with the operating system and provide calls to the operating system from programs or applications executing on data processing system 200.

Instructions for the operating system, the artifact-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
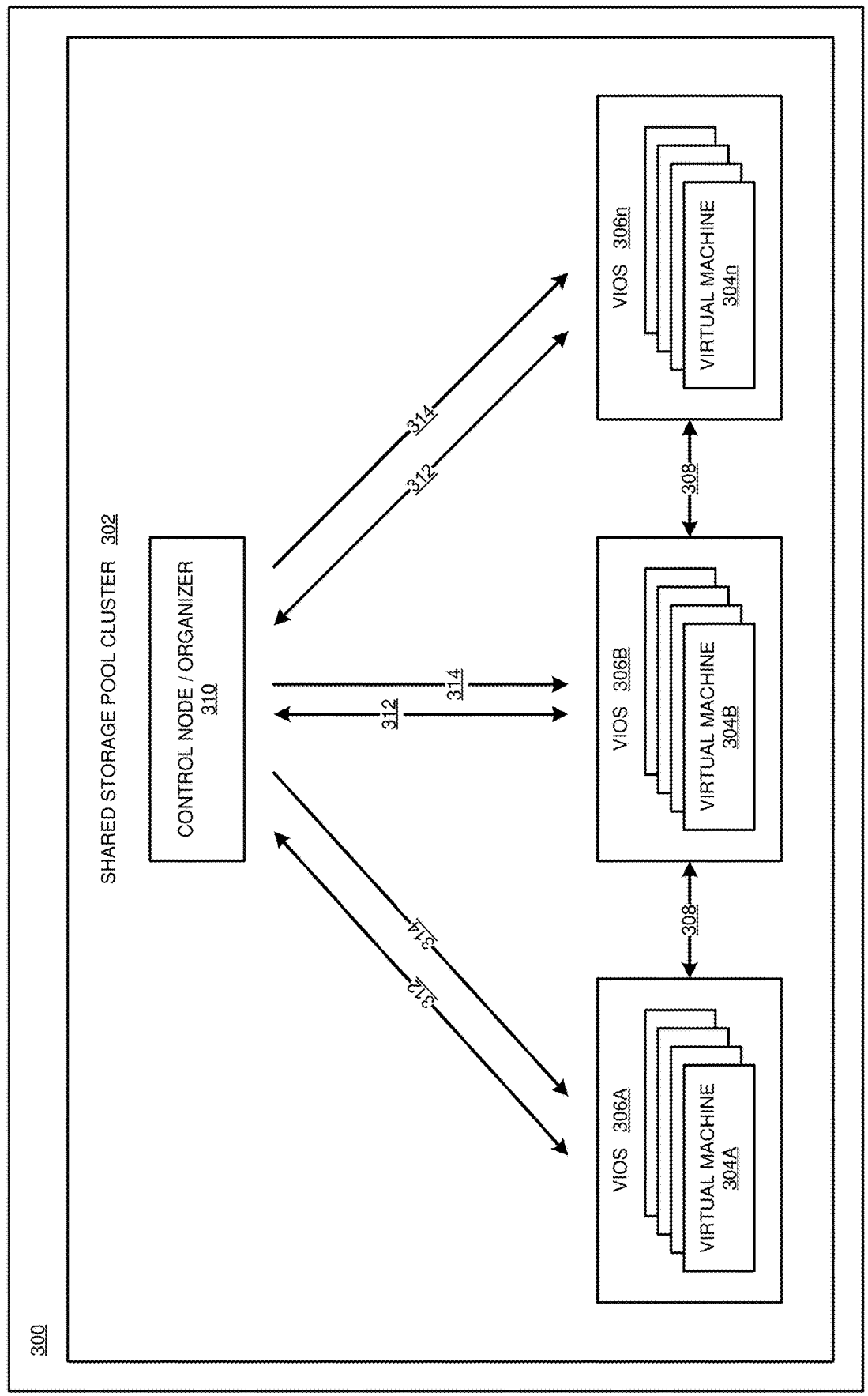
FIG. 3 depicts a functional diagram of a shared storage pool cluster made of a control node and a VM monitoring several VIOSes each comprising multiple VMs in accordance with an illustrative embodiment.

With reference to FIG. 3, this figure depicts a functional diagram 300 of an example SSP cluster (SSP) 302 made of a control node (organizer) 310 and a VM 304A monitoring several VIOSes 306A-306n, with each VIOS 306A-306n comprising multiple VMs 304A-304n in accordance with an illustrative embodiment. In some embodiments, control node 310 runs the software application KSYS module for monitoring the VIOSes 306A-306n and VMs 304A-304n. According to some embodiments, control node 310 is a dedicated processor for monitoring the health and status of each VM 304A-304n through communication with the VIOSes 306A-306n. In another embodiment, control node 310 is a server, such as server 106 of FIG. 1, assigned the additional task of monitoring the health of status of various VMs 304A0394n while also executing applications assigned to it via the data processing system 200 of FIG. 2.

In the SSP 302, a number of VMs 304A-304n are associated with a VIOS 306A-306n. Each VIOS 306A-306n maintains communications with each VM 304A-304n. In some embodiments, the communications utilize the bus 238 of FIG. 2. In addition, each VIOS 304A-304n maintains a network connection 308 with other VIOSes 304A-304n, such as network 102 of FIG. 1. Using the bus 238 and the network 102, each VIOS 306A-306n queries and receives health and status information on each VM 304A-304n it is associated with. Furthermore, each VIOS 306A-306n maintains a record of the health and status of each VM 304A-304n and updates the record periodically. The data processing system 200 using this record to make policy decision son which VM 304A-304n to select for a particular task, which VM 304A-304n to use during DR efforts, which VM 304A-304n requires attention, and the like.

The control node 310 periodically sends a query request (query) 312 to each VIOS 306A-306n to ascertain the status of each VM 304A-304n. In some embodiments, the queries 312 from the control node 310 occurs every 100 milliseconds, which in other embodiments, the queries 312 are sent once every second. Other examples are possible and are not limited by this example. In response to the queries 312, each VIOS 306A-306n replies with the record of the health and status of each VM 304A-304n associated with that VIOS 306A-306n that was previously updated. In this manner, control node 310 receives the health and status of each VM 304A-304n without having to contact each and every VM 304A-304n. When, as part of a HA or DR effort, the control node 310 selects a VM 304A-304n to take over tasks or to go offline, a command 314 is sent to the appropriate VIOS 306A-306n, which forwards the command 314 to the appropriate VM 304A-304n.

According to some embodiments, one or more VM's, such as VM 304A monitors the health and status, and the performance metrics of every other VM 304A-304n, as well as monitoring the performance of the VIOSes 306A-306n. When an issue arises, such as when a performance bottleneck occurs within a VM 304A-304n, or between VIOSes 306A-306n, the VM 304A performs several actions, such as sending a flag to the control node 310 or alerting a user for further administration action. In this manner, a VM 304A monitors and reports on workload tasking, performance metrics, and application parameters. Therefore, the VM 304A monitoring other VM's 304A-304n and VIOSes 306A-306n instigates a management action by alerting the control node 310 of a possible issue, providing improved system performance for the entire SSP cluster 302.

Figure 4:
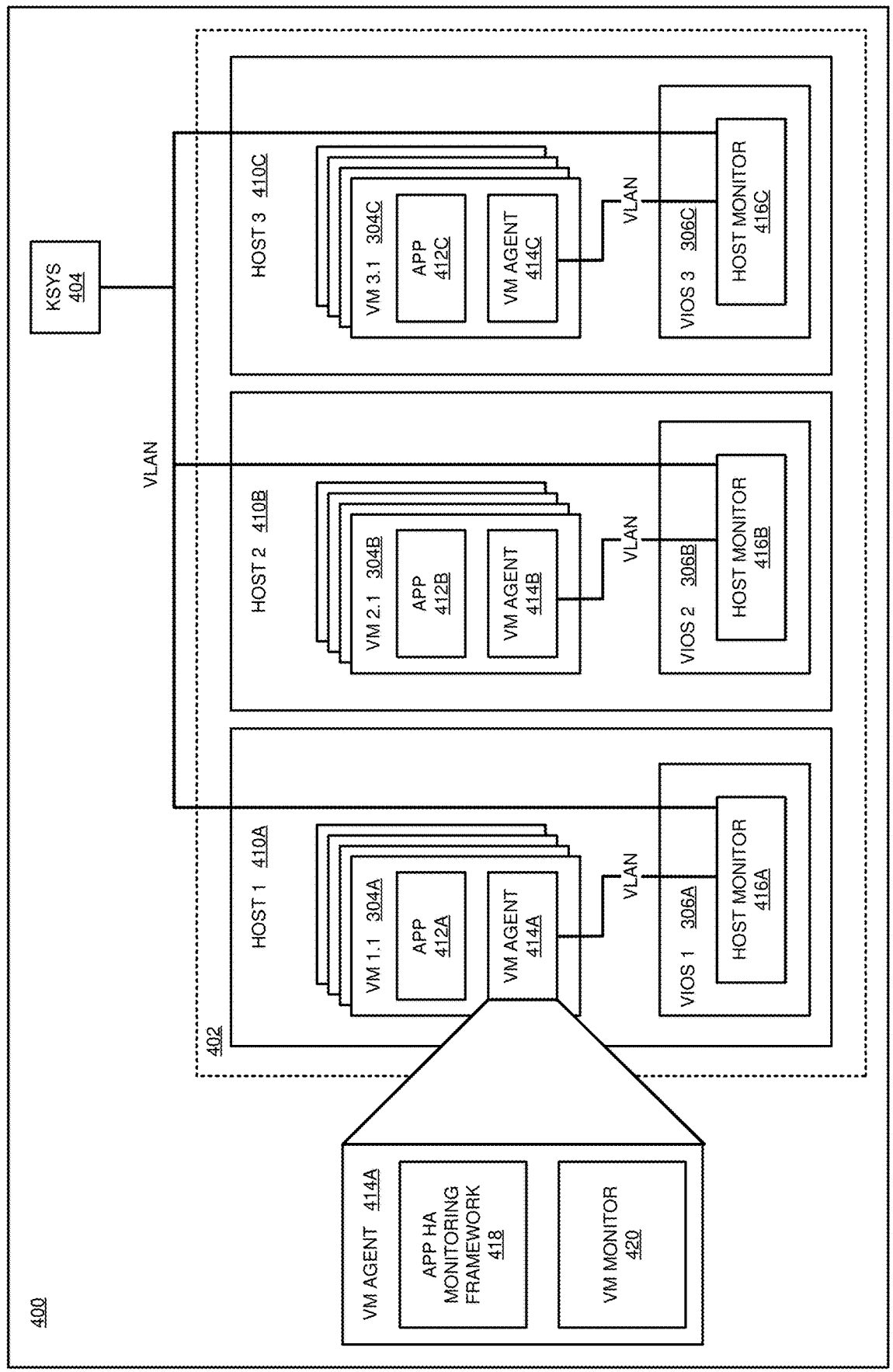
FIG. 4 depicts a block diagram of multiple hosts in a managed system each containing multiple VIOSes and VMs in accordance with an illustrative embodiment.

With reference to FIG. 4, this figure depicts a block diagram 400 of multiple hosts 410A-410C in a managed system 402 with each host 410A-410C containing multiple VIOSes 306A-306C and VMs 304A-304C in accordance with an illustrative embodiment. In the present example, managed system 402 is comprised of three VIOSes 306A-306C, with each VIOS 306A-306C associated with multiple groups of VM's 304A-304C. According to some embodiments, there is at least one VM 304 associated with each VIOS 306. According to some embodiments, managed system 402 is associated with at least one VIOS 306. Other embodiments are possible and are not limited by the example disclosed herein.

Each VIOS 306A-306C communicates with their associated VM's 304A-304C by using a virtual local area network (VLAN). The communications between the VM's 304A-304C and the VIOSes 306A-306C includes health and status information. The health and status information is stored in a distributed database, such as database 109 of FIG. 1. Each VIOS 306A-306C has access to the health and status information stored in the distributed database. A KSYS node 404 also has access to the distributed database and the health and status information stored within. In this manner, the KSYS node 404 can query a single VIOS 306A-306C and collect the health and status information of each VM 304A-304C in the managed system 402. In other embodiments, the KSYS node 404 can access the health and status information of each VM 304A-304n of the entire SSP 302 of FIG. 3 by querying a single VIOS 306A-306n of FIG. 3.

According to some embodiments, one VM 304A monitors the other VM's within the same host 410A and records the parameters to a database. The parameters can include, but are not limited to, application status, node health status, latency, availability, and utilization rate. When a VM 304A executes a monitoring application, or engine, the VM 304A is performing the functions of workload management instigated by the VM 304A itself. In this manner, the VM 304A alerts the control node 310 for further management action, which includes but is not limited to, assigning additional hardware resources to a task, flagging the affected VM's 304 at issue, redirecting work assignments to other available VM's 304, and the like. Other embodiments are possible and are not limited by these examples.

Continuing with FIG. 4, each VM 304A-304C includes at least one software application 412A-412C. Each application 412A-412C operates independently of every other application 412A-412C. Each VM 304A-304C also includes a VM agent 414A-414C that is comprised of an application HA monitoring framework 418 and a VM monitor 420. The monitoring framework 418 collects health status information on the VM 304 to include, but not limited to application status, node health status, latency, availability, and utilization rate, and the like. The VM monitor 420 collates the health and status information collected by the monitoring framework 418 and transmits the information to a host monitor 416 located within the parent VIOS 306. In the present embodiment, FIG. 4 shows three host monitors 416A, 416B, and 416C as a component of VIOS 1 306A, VIOS 2 306B, and VIOS 3 306C, respectfully. The health and status information collected by the VM monitor 420 is sent via a VLAN connection to each of the three host monitors 416A-416C.

Figure 5:
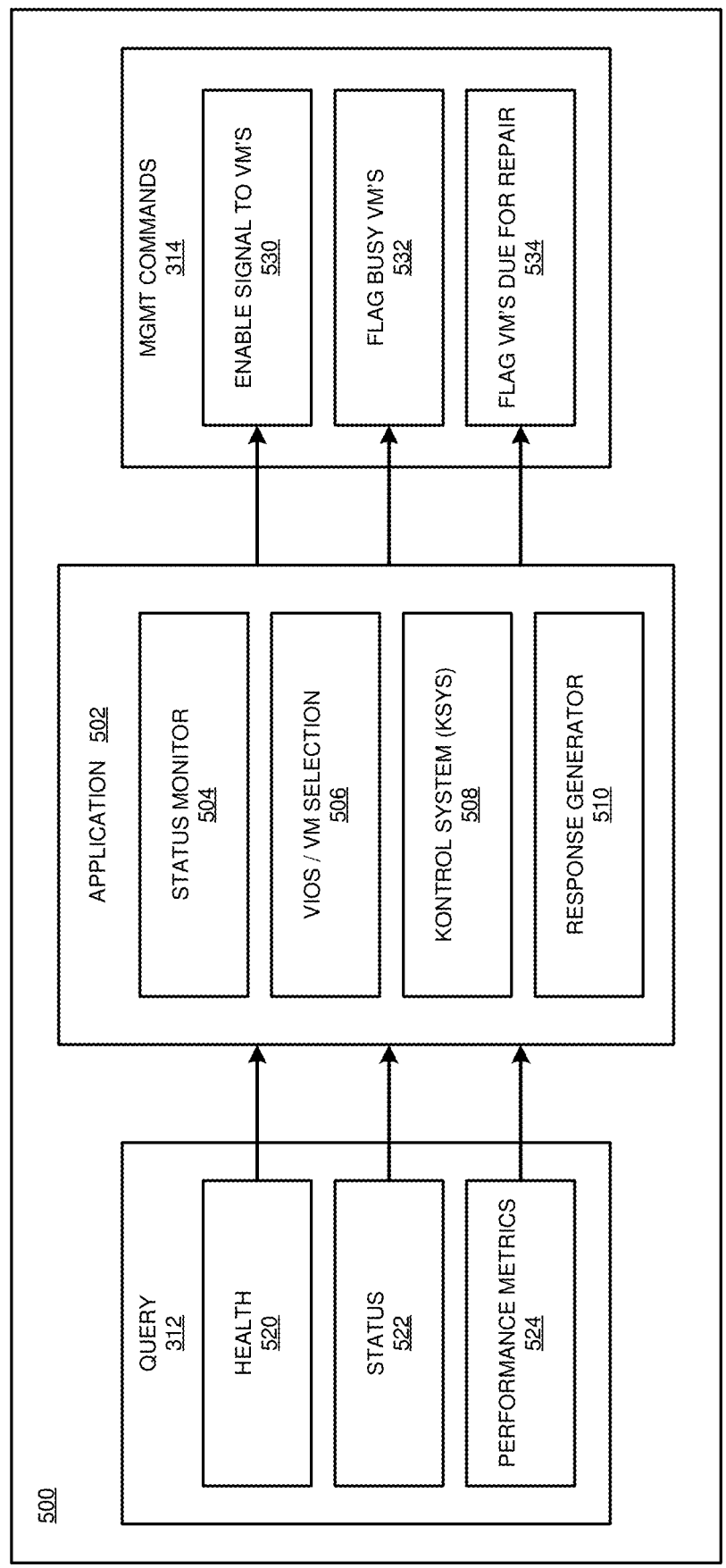
FIG. 5 depicts a block diagram of an example application that runs on a VM for monitoring computer resources using a cluster-wide view in accordance with an illustrative embodiment.

With reference to FIG. 5, this figure depicts a block diagram of an example application system 500 that runs on a VM 304A for monitoring computer resources using a cluster-wide view in accordance with an illustrative embodiment. The application system 500 includes application 502, health and status report queries 312, and management commands 314. According to some embodiments, application 502 is an example of application 105 of FIG. 1. In other embodiments, application 502 resides on data processing system 200 of FIG. 2. In yet other embodiments, application 502 resides on the control node 310 of FIG. 3.

Application 502 includes a list of processes, including a status monitoring module 504, a VIOS/VM selection module 506, a KSYS module 508, and a response generator 510. The status monitor module 504 maintains a record of the health and status of each VIOS 306 and VM 304 in the system by sending a query 312 to each VIOS 306A-306n and receiving a record in reply. Each record contains health and status data on each VM 304A-304n associated with that VIOS 306A-306n. According to one embodiment, the query 312 includes at least one of a health query 520, a status query 522, and a performance metric query 524. Each query 312 is generated either periodically or as needed by the control node 310. In at least some embodiments, the control node 310 maintains a consolidated file of health and status records received from the various VIOSes 306A-306n over time. As each new record is received, the consolidated record maintained by the control node 310 is updated and older data overwritten or deleted. In some embodiments, the performance metric query 524 prompts a report on the VM 304A-304n itself, to include, but not limited to, efficiency rate, memory usage rate, faults present, utilization level, and the like. In some embodiments, the performance metric is a parameter value related to the VM 304A-304n as compared to a threshold value. One example of a parameter value would be the current available memory as compared to a minimum threshold memory size required for a particular application. Parameters can also be related to workload, latency, availability, utilization rate, efficiency, and the like. Other parameters are possible as well as an associated threshold value. This embodiment is just one example and is not limiting. Other embodiments are possible as disclosed herein.

Another process of the application 502 is the VIOS/VM selection module 506. The selection module 506 references the consolidated record file and identifies those VMs 304A-304n from the record of all VMs 304A-304n. The identification of VMs 304A-304n can include, but are not limited to available VMs 304A-304n, off-line VMs 304A-304n, VMs 304A-304n running outdated software or operating systems, VMs 304A-304n currently busy, and the like. The selection module 506 considered the consolidated record, and the performance metrics, in making this determination.

The KSYS module 508 generates queries 312 to send to each VIOS 306A-306n, receives replies from each VIOS 306A-306n in response to the query 312, selects one or more VM 304A-304n of interest, and maintains the consolidated record list in an effort to manage the entire SSP. The KSYS module 508 enables the application of GDR HA solutions by administering control over the SSP network of VIOSes 306A-306n and VMs 304A-304n. In some embodiments, there are hundreds of VMs 304A-304n situated across several different physical areas. In operation, the KSYS module 508 queries each VIOS 306A-306n that makes up the SSP cluster 302. Using the KSYS module 508 allows for the control node 310 to manage each VM 304A-304n without requiring the control node 310 to establish and maintain a communications link with each VM 304A-304n.

The application 502 generates one or more management commands 314 by using a response generator 510. The response generator 510 receives prompts from the KSYS module 508 and generates the appropriate response as disclosed below. The management commands 314 include an "enable signal to VM's" 530 to each VM 3094A-304n, which directs a specific VM 304A-304n to go offline, to become enabled, to execute a process, and the like. Another command 314 sent by the control node 310 to the VMs 304A-304n is a "flag busy VM's" signal 532 which notifies the data processing system 200 that a specific VM 304A-304n is busy and unavailable for further tasking. For those VMs 304A-304n that notify their associated VIOS 306A-306n of a maintenance or performance problem, the control node 310 can generate a "flag VM's for repair" signal 534. The "flag VM's for repair" signal 534 alerts the data management system 200 that the given VM 304A-304n is unavailable and requires attention by a user.

Figure 6:
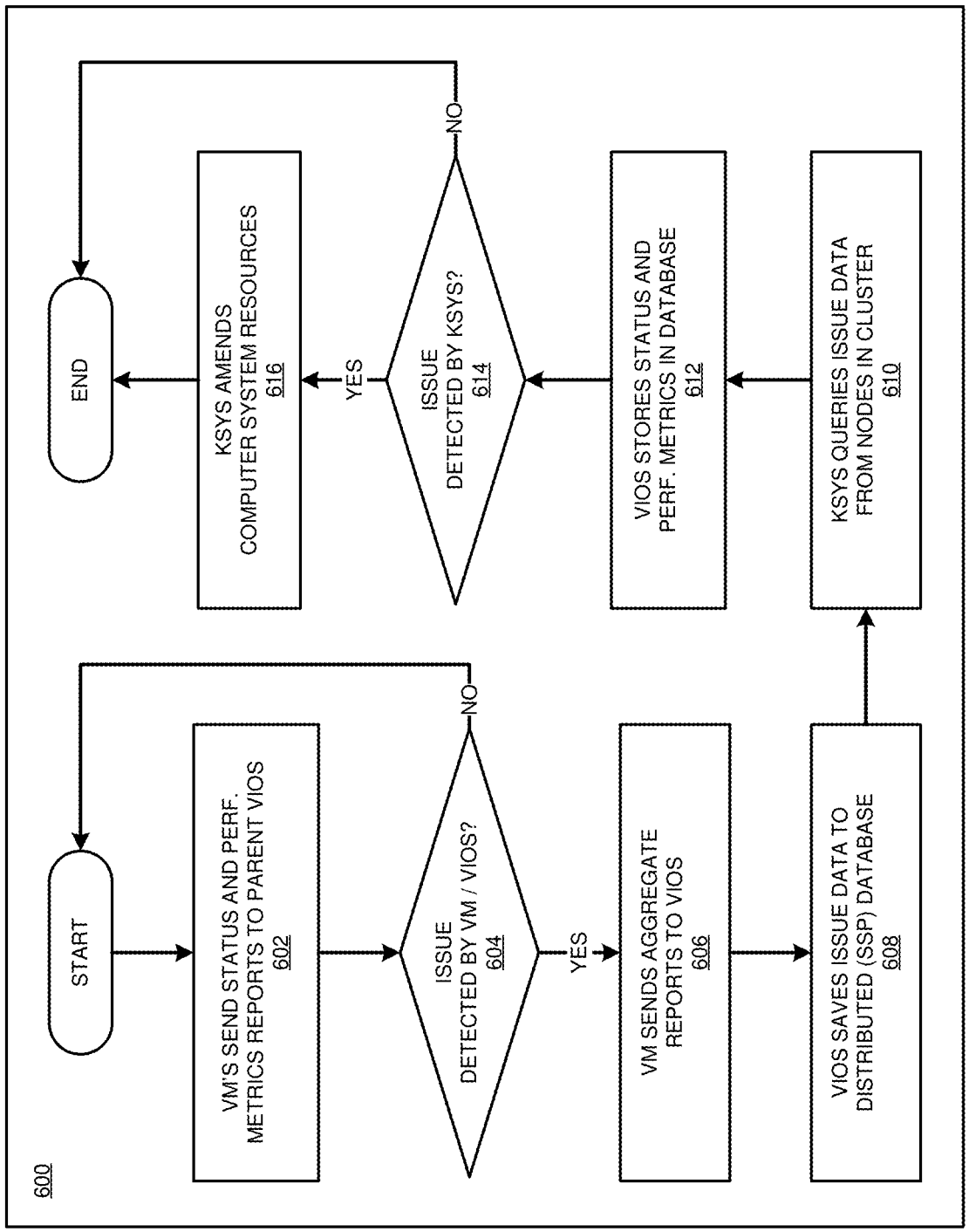
FIG. 6 depicts a flowchart of an example process for monitoring VMs associated with several VIOSes with one VM in accordance with an illustrative embodiment.

With reference to FIG. 6, this figure depicts a flowchart of an example process 600 for monitoring VMs 304A-304n associated with several VIOSes 306A-306n using a VM 304A in accordance with an illustrative embodiment. Process 600 begins at block 602, where the VMs 304A-304n each sends their health and status reports to their patent VIOS 306A-306n. Each report is also monitored by one or more VM's 304A as disclosed herein. As disclosed herein, the health and status report can also include performance metrics to include, but not limited to application status, node health status, latency, availability, and utilization rates on the VM 304A-304n being queried.

Next, at decision block 604, the VM 304A monitoring the performance metrics and health and status of the other VMs 304 seeks to detect a metric that exceeds a predetermined threshold value. According to some embodiments, such as when a VM 304 is offline, the VIOS 306 performs the function of monitoring and detecting issues with the performance metric or status reports. In some embodiments, the threshold value can be a minimum or maximum permissible time period, a workload rate, an allocation rate, a memory assigned value, and the like. If the threshold value is within permissible values, the process starts over at block 602. If, however, a threshold value is exceeded, the VM 304A monitoring other nodes in the system determined that an issue is present and the process moves to block 606.

Next, at block 606, the parent VIOS 306A-306n received status data from each VM 304. The VM's 304A-304n sends each individual health and status report to their respective parent VIOS 306A-306n. The VIOSes 306A-306n aggregates them into a combined report. Each VIOS 306A-306n sends a separate report. Next, at block 608, each VIOS 306A-306n saves the aggregated status reports and performance metrics into the distributed (SSP) database such as database 109 of FIG. 1. The process continues at block 610 where the control node 310 running the KSYS module 508 of FIG. 5 queries the status reports and performance metrics data from the nodes in the SSP cluster, such as the VM's 304A-304n and VIOSes 306A-306n. Next, at block 612, the VIOS es 306A-306n collects all of the various reports and consolidates the reports into a database for future reference. Next, at decision block 614, the KSYS module 508 reviews the consolidated report residing on the database. If no issue is detected ("No"), the process is complete and the process 600 is repeated. If, however, an issue with a particular VM 304A-304n is detected ("Yes"), the process continues at block 616 where the KSYS module 508 identifies the affected VM 304A-304n and identifies a response. A response can be initiated by the control node 310 and can include reassigning computer resources, flagging a portion of memory as offline, and the like.

Thus, a computer implemented method, computer program product, and system are provided in the illustrative embodiments for administering a SSP of computer resources and other related features, functions, or operations. Where an embodiment or a portion thereof is described with respect to a type of device, the computer implemented method, computer implemented program product, or system, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or artifact code written in any combination of one or more programming languages, including an artifact oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of administering a shared pool of computer system resources, the method comprising:
monitoring, by a first virtual input/output server (VIOS) in a set of VIOSs virtualizing a first physical adapter card for a first set of virtual machines (VMs), parameters associated with performance of each VM in the first set of VMs and performance of the first VIOS, wherein the first VIOS receives a first record comprising values of the parameters, the first VIOS executing in a computer system resource in the shared pool of computer system resources;
maintaining, by the first VIOS, a database comprising the first record, the database accessible by a second VIOS in the set of VIOSs, the second VIOS virtualizing a second physical adapter card for a second set of VMs, the second VIOS monitoring parameters associated with performance of each VM in the second set of VMs and performance of the second VIOS;
configuring a control node relative to the shared pool of computer system resources such that the control node is enabled to receive a status of any VIOS in the set of VIOSs and a status of any VM being managed by any VIOS in the set of VIOSs by querying a single VIOS in the set of VIOSs;
providing, by the first VIOS responsive to a query from an application in the control node, the first record to the application;
causing, responsive to the application determining that a parameter value in the first record exceeds a first threshold value, the application to direct a first VM in the first set of VMs to execute a VM management command, wherein the VM management command comprises directing the first VM to either go offline, to become enabled or to execute a process; and
causing, responsive to receiving the VM management command, the first VM in the first set of VMs to execute the VM management command.

2. The method of claim 1, wherein the parameters are comprised of a subset of a set comprising application status, node health status, latency, availability, and utilization rate.

3. The method of claim 1, further comprising causing flagging, by the application responsive to the determining that the parameter value in the first record exceeds the first threshold value, a computer system resource in the shared pool of computer system resources.

4. The method of claim 1, further comprising causing allocating, by the application responsive to the determining that the parameter value in the first record exceeds the first threshold value, an additional computer system resource based on performance metrics associated with the computer system resources, wherein the performance metrics comprises a subset of a set comprising storage capacity, availability, error rate, and operating system version.

5. The method of claim 1, wherein the first VM in the first set of VMs and a VM in the second set of VMs operate different operating systems.

6. The method of claim 1, wherein the application runs in the first VM in the first set of VMs.

7. The method of claim 1, further comprising:
causing monitoring, by the application, a workload balance value associated with the shared pool of computer system resources;
causing determining, by the application, whether the workload balance value exceeds a second threshold value; and
responsive to the workload balance value exceeding the second threshold value, causing the application to alter a status of the first VM.

8. A computer usable program product, comprising one or more computer-readable storage media and program instructions stored on at least one of the one or more computer-readable storage media, the stored program instructions comprising:
program instructions to monitor, by a first virtual input/output server (VIOS) in a set of VIOSs virtualizing a first physical adapter card for a first set of virtual machines (VMs), parameters associated with performance of each VM in the first set of VMs and performance of the first VIOS, wherein the first VIOS receives a first record comprising values of the parameters, the first VIOS executing in a computer system resource in a shared pool of computer system resources;
program instructions to maintain, by the first VIOS, a database comprising the first record, the database accessible by a second VIOS in the set of VIOSs, the second VIOS virtualizing a second physical adapter for a second set of VMs, the second VIOS monitoring parameters associated with performance of each VM in the second set of VMs and performance of the second VIOS;
program instructions to configure a control node relative to the shared pool of computer system resources such that the control node is enabled to receive a status of any VIOS in the set of VIOSs and a status of any VM being managed by any VIOS in the set of VIOSs by querying a single VIOS in the set of VIOSs:
program instructions to provide, by the first VIOS responsive to a query from an application in the control node, the first record to the application;
program instructions to cause, responsive to the application determining that a parameter value in the first record exceeds a first threshold value, the application to direct a first VM in the first set of VMs to execute a VM management command, wherein the VM management command comprises directing the first VM to either go offline, to become enabled or to execute a process; and
program instructions to cause, responsive to receiving the VM management command, the first VM in the first set of VMs to execute the VM management command.

9. The computer usable program product of claim 8, wherein the parameters are comprised of a subset of a set comprising application status, node health status, latency, availability, and utilization rate.

10. The computer usable program product of claim 8, further comprising program instructions to cause flagging, by the application responsive to the determining that the parameter value in the first record exceeds the first threshold value, a computer system resource in the shared pool of computer system resources.

11. The computer usable program product of claim 8, further comprising program instructions to cause allocating, by the application responsive to the determining that the parameter value in the first record exceeds the first threshold value, an additional computer system resource based on performance metrics associated with the computer system resources, wherein the performance metrics comprises a subset of a set comprising storage capacity, availability, error rate, and operating system version.

12. The computer usable program product of claim 8, wherein the first VM in the first set of VMs and a VM in the second set of VMs operate different operating systems.

13. The computer usable program product of claim 8, wherein the application runs in the first VM in the first set of VMs.

14. The computer usable program product of claim 8, further comprising:
program instructions to cause monitoring, by the application, a workload balance value associated with the shared pool of computer system resources;
program instructions to cause determining, by the application, whether the workload balance value exceeds a second threshold value; and
responsive to the workload balance value exceeding the second threshold value, program instructions to cause the application to alter a status of the first VM.

15. The computer usable program product of claim 8, wherein the stored program instructions is computer usable code stored in a computer-readable storage medium in a data processing system, and wherein the stored program instructions are transferred over a network from a remote data processing system.

16. The computer usable program product of claim 8, wherein the stored program instructions is computer usable code stored in a computer readable storage medium in a server data processing system, and wherein the computer usable code is downloaded over a network to a remote data processing system for use in a computer readable storage medium associated with the remote data processing system.

17. A computer system comprising one or more processors, one or more computer-readable memories, one or more computer-readable storage media, and program instructions stored on at least one of the one or more computer-readable storage media for execution by at least one of the one or more processors via at least one of the one or more memories, the stored program instructions comprising:
program instructions to monitor, by a first virtual input/output server (VIOS) in a set of VIOSs virtualizing a first physical adapter card for a first set of virtual machines (VMs), parameters associated with performance of each VM in the first set of VMs and performance of the first VIOS, wherein the first VIOS receives a first record comprising values of the parameters, the first VIOS executing in a computer system resource in a shared pool of computer system resources;

program instructions to maintain, by the first VIOS, a database comprising the first record, the database accessible by a second VIOS in the set of VIOSs, the second VIOS virtualizing a second physical adapter for a second set of VMs, the second VIOS monitoring parameters associated with performance of each VM in the second set of VMs and performance of the second VIOS;

program instructions to configure a control node relative to the shared pool of computer system resources such that the control node is enabled to receive a status of any VIOS in the set of VIOSs and a status of any VM being managed by any VIOS in the set of VIOSs by querying a single VIOS in the set of VIOSs:

program instructions to provide, by the first VIOS responsive to a query from an application in the control node, the first record to the application;

program instructions to cause, responsive to the application determining that a parameter value in the first record exceeds a first threshold value, the application to direct a first VM in the first set of VMs to execute a VM management command, wherein the VM management command comprises directing the first VM to either go offline, to become enabled or to execute a process; and program instructions to cause, responsive to receiving the VM management command, the first VM in the first set of VMs to execute the VM management command.

18. The computer system of claim 17, further comprising:

program instruction to cause monitoring, by the application, a workload balance value associated with the shared pool of computer system resources;

program instructions to cause determining, by the application, whether the workload balance value exceeds a second threshold value; and responsive to the workload balance value exceeding the second threshold value, program instructions to cause the application to alter a status of the first VM.

* * * * *